United States Patent [19]

Bell

[11] 4,049,130

[45] Sept. 20, 1977

[54] APPARATUS FOR HANDLING AND MOVING ARTICLES

[75] Inventor: John T. Bell, St. Charles, Ill.

[73] Assignee: Container Corporation of America, Chicago, Ill.

[21] Appl. No.: 667,254

[22] Filed: Mar. 16, 1976

[51] Int. Cl.² .......................................... B65G 59/06
[52] U.S. Cl. .............................. 214/8.5 A; 214/8.5 F; 214/8.5 SS; 221/207; 221/270
[58] Field of Search ............... 221/308, 310, 267, 270, 221/232, 206, 207; 214/8.5 R, 8.5 A, 8.5 F, 8.5 K, 8.5 SS

[56] References Cited

U.S. PATENT DOCUMENTS

| | | | |
|---|---|---|---|
| 2,934,221 | 4/1960 | Tonna | 214/8.5 F X |
| 3,687,303 | 8/1972 | Kramer et al. | 214/8.5 SS |
| 3,892,319 | 7/1975 | Sarring | 214/8.5 SS X |

Primary Examiner—Frank E. Werner
Attorney, Agent, or Firm—Carpenter & Ostis

[57] ABSTRACT

Apparatus for counting yieldable flat articles such as paperback books or the like consisting of a stack of books with their sides in contacting relationship, the books being guided in such a fashion that a measured quantity may be removed by structure engaging the stack and movable translatively of the longitudinal axis of the stack. The stack guiding structure is provided with means for preventing movement of the stack in the guiding structure during the removing operation and return thereof. Structure is provided for moving the books in the guiding structure and subsequently placing a load on the books along the longitudinal axis thereof and counting the books by measuring part of the stack when so loaded.

2 Claims, 6 Drawing Figures

APPARATUS FOR HANDLING AND MOVING ARTICLES

BACKGROUND OF THE INVENTION

The invention herein finds particular application in the production and packaging of paperback books, which are printed and bound in such quantities that counting of the individual books is extremely difficult. Books are delivered from the trimmer and edge coater in a solid log at extremely high speeds, and separation of the books for individual sensing and counting is not easily achieved.

The invention herein is directed to the counting of the books by measurement while a load is placed on a stack thereof. Since the books in a stack are resilient there is a stress-strain relationship whereby a constant number may be picked from a stack thereof undergoing a predetermined load.

THE DRAWINGS

FIG. 1 is an elevational schematic view illustrating the use of the invention apparatus in a machine for packaging paperback books or the like;

Figure 1:
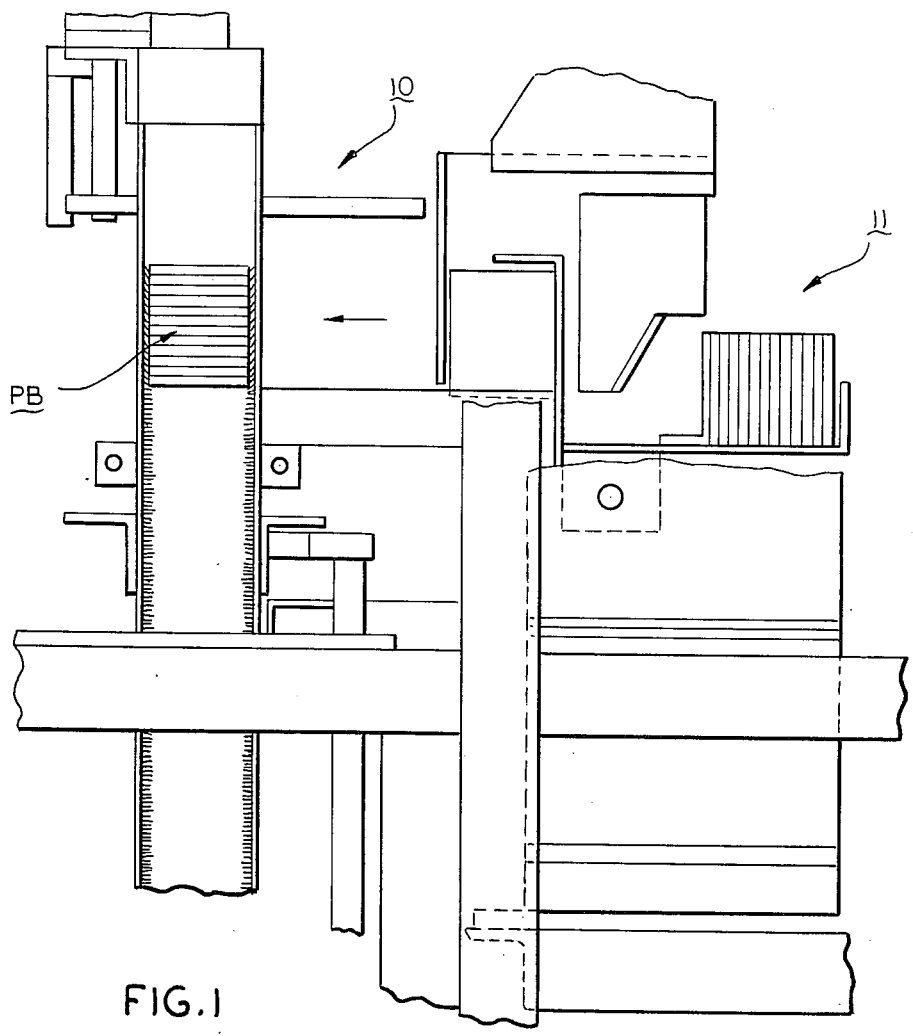

Referring particularly to FIG. 1 of the drawings, the improved apparatus according to the present invention is denoted generally by the reference numeral 10 and is shown in the environment of a machine 11 for packaging flat articles such as paperback books or the like as is disclosed in an application of John T. Bell, Ser. No. 667,253, filed Mar. 16, 1976.

Figure 2:
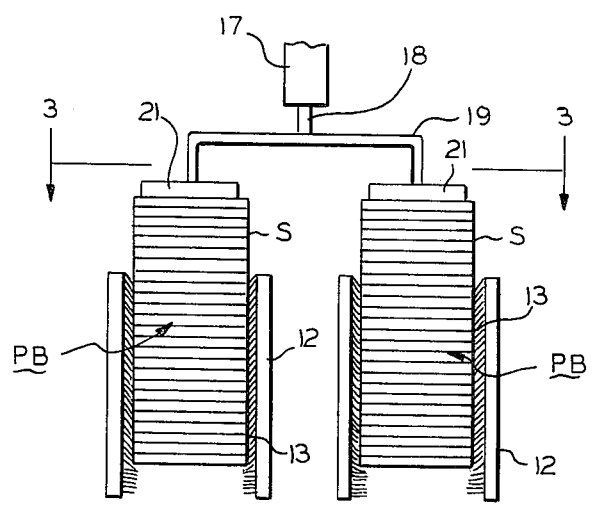
FIG. 2 is a schematic elevational view showing structure for placing a predetermined load on a stack of paperback books.
Figure 3:
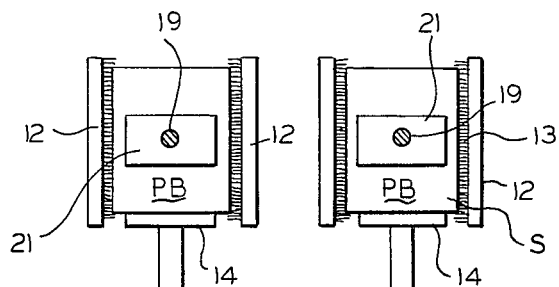
FIG. 3 is a view looking in the direction of the arrows 3—3 of FIG. 2, showing structure for placing books in side-by-side stacks.

The books PB are transferred to the tops of the stacks S by pusher devices 14 seen in FIG. 3, and disclosed in the aforementioned Bell application, to a position as seen in FIG. 2.

Figure 4:
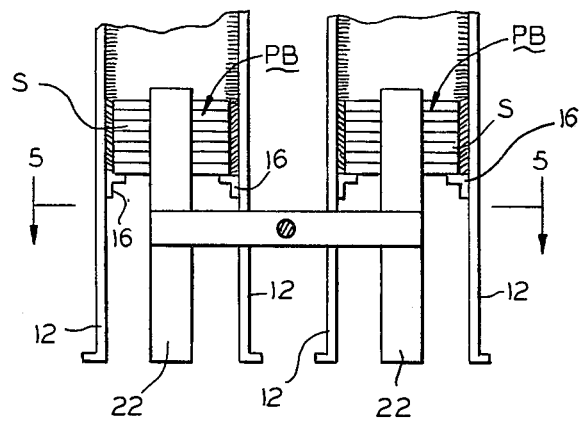
FIG. 4 is a side elevational view looking in the direction of the arrows 4—4 of FIG. 3.
Figure 5:
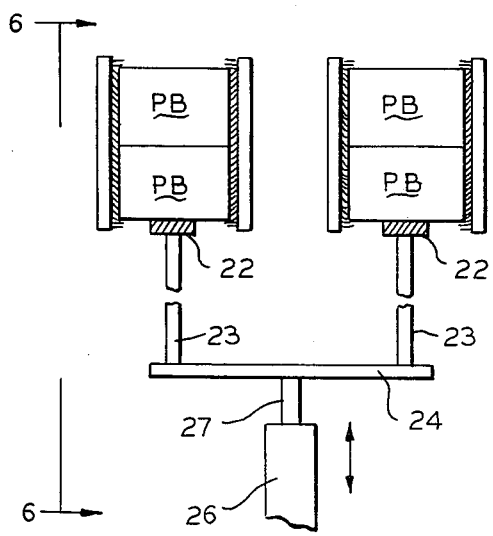
FIG. 5 is a plan view looking in the direction of the arrows 5—5 of FIG. 4 and showing structure for moving a measured group of books from the stack.
Figure 6:
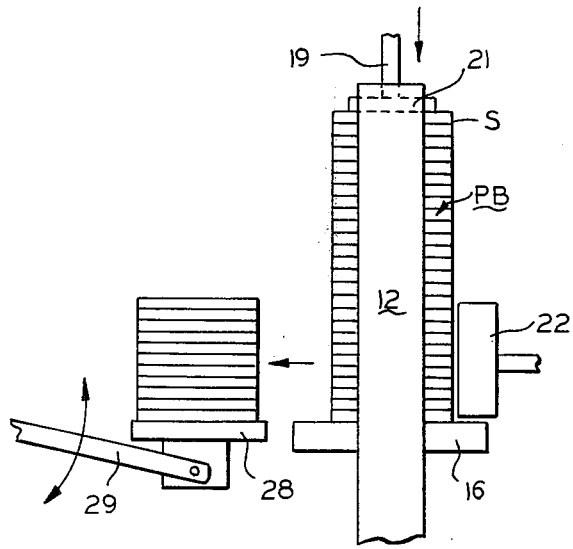
FIG. 6 is an elevational view looking in the direction of the arrows 6—6 of FIG. 5.

The lower ends of the stacks S rest upon rails 16 retained adjustably in position on the guides 12, as seen in FIG. 4.

Structure is provided for imposing a longitudinally directed pressure load of a known amount on the stacks S to the end that there is a known relationship between such load and a space occupied by a known number of books compressed under said load so that the mechanism (later described) slicing the books from the stack S can be calibrated or adjusted to slice off a given number of books per slice. To this end pressure is placed against the books PB by a pressure cylinder 17 having a piston rod 18 secured to a yoke 19 terminating in pressure platens 21 bearing against the top of the stacks S.

A known quantity of books is sliced from the lower ends of the stacks S by horizontally movable counting-by-measuring structure including vertically extending pushers 22 secured to push rods 23 secured at their outer ends to a yoke 24. A cylinder 26 has a piston rod 27 connected to yoke 24, and upon actuation of cylinder 26 the books at the lower end of the stacks S are sliced therefrom. As movement of the pushers 22 takes place the pressure from cylinder 17 is relieved.

The restraining means 13 retain the books in position until cylinder 26 returns to its start position, whereupon the stacks S are again loaded once more by pusher devices 14, the stacks moving downward to the angle members 16 to be subsequently loaded by application of pressure by cylinder 17.

The operation of the pushers 22 is such as to place the measured (counted) stacks on to a platform 28 movable in a vertical direction to raise four contiguous stacks S arranged in two rows. The platform 28 is mounted at the end of a lift arm 29 movable angularly to lift the stacks to a desired position for packing into a container tube as disclosed in the aforementioned Bell application.

I claim:

1. Apparatus for moving a portion consisting of a predetermined number of yieldable flat articles, such as paperback books or the like, from a group of such articles disposed with the sides thereof in contiguous relationship, said apparatus comprising:
   a. guide means for maintaining a group of said yieldable articles in aligned contiguous relationship;
   b. said guide means having an opening on one side thereof to accomodate the movement of a portion of said group out of side guide means in a direction transverse to a longitudinal axis passing through said group;
   c. means for imposing a varying pressure load along the longitudinal axis of said group so that the compression of said group will cause a predetermined number of articles to be in said portion;
   d. means engageable with a side of said portion and movable in a direction transverse to said longitudinal axis to remove said portion from said group maintained in said guide means.

2. Apparatus according to claim 1, wherein said means engageable with a side of said portion removes said portion from the lower segment of said group.

* * * * *